(12) United States Patent
Tsuji

(10) Patent No.: US 10,844,926 B2
(45) Date of Patent: Nov. 24, 2020

(54) SHOCK ABSORBER

(71) Applicant: KYB Corporation, Tokyo (JP)

(72) Inventor: Wataru Tsuji, Tokyo (JP)

(73) Assignee: KYB CORPORATION, Tokyo (JP)

( * ) Notice: Subject to any disclaimer, the term of this patent is extended or adjusted under 35 U.S.C. 154(b) by 44 days.

(21) Appl. No.: 15/565,710

(22) PCT Filed: Jun. 2, 2016

(86) PCT No.: PCT/JP2016/066383
§ 371 (c)(1),
(2) Date: Oct. 11, 2017

(87) PCT Pub. No.: WO2016/199667
PCT Pub. Date: Dec. 15, 2016

(65) Prior Publication Data
US 2018/0080518 A1    Mar. 22, 2018

(30) Foreign Application Priority Data
Jun. 10, 2015   (JP) .................................. 2015-117081

(51) Int. Cl.
*F16F 9/34*     (2006.01)
*F16F 9/44*     (2006.01)
(Continued)

(52) U.S. Cl.
CPC .................. *F16F 9/34* (2013.01); *F16F 9/10* (2013.01); *F16F 9/3214* (2013.01);
(Continued)

(58) Field of Classification Search
CPC .. F16F 9/34; F16F 9/342; F16F 9/3488; F16F 9/10; F16F 9/14; F16F 9/16; F16F 9/18;
(Continued)

(56) References Cited

U.S. PATENT DOCUMENTS 3,795,255 A * 3/1974 Malott ................... F15B 11/02
                                                           137/102
4,838,394 A * 6/1989 Lemme .................. B60G 17/08
                                                           188/282.1
(Continued)

FOREIGN PATENT DOCUMENTS

DE          19724328 C1    10/1998
EP           1106403 A2     6/2001
(Continued)

OTHER PUBLICATIONS

EPO translation, EP 1106403 A2, dated Jun. 2001. (Year: 2001).*
Feb. 5, 2019, European Search Report issued for related EP Application No. 16807374.0.

*Primary Examiner* — Thomas J Williams
(74) *Attorney, Agent, or Firm* — Paratus Law Group, PLLC

(57) ABSTRACT

A shock absorber reduces shocks when transitioning from a low speed region to a high speed region without impairing ride quality in an ultra-low speed region. The shock absorber includes a compression-side second damping passage connecting two chambers by bypassing a compression-side main valve opening/closing a compression-side first damping passage connecting the two chambers to give resistance to liquid flowing in the compression-side first damping passage, and a compression-side throttle valve throttling the compression-side second damping passage. The compression-side throttle valve includes a housing including a valve seat provided at one end, a case inserted in the housing enabling adjustment of a position in the housing, a valve body movably inserted at one end in the case toward the valve seat and restricted from moving to a side of the valve seat in the case, and a coil spring biasing the valve body to the side of the valve seat.

8 Claims, 4 Drawing Sheets

(51) Int. Cl.
  *F16F 9/10* (2006.01)
  *F16F 9/32* (2006.01)
  *B60G 15/12* (2006.01)

(52) U.S. Cl.
  CPC .............. *F16F 9/3235* (2013.01); *F16F 9/44* (2013.01); *F16F 9/446* (2013.01); *B60G 15/12* (2013.01); *F16F 2224/04* (2013.01)

(58) Field of Classification Search
  CPC ........ F16F 9/19; F16F 9/28; F16F 9/44; F16F 9/446; F16F 9/461; F16F 9/462
  USPC .......................... 188/314, 318, 319.2, 322.13
  See application file for complete search history.

(56) References Cited

U.S. PATENT DOCUMENTS

| | | | | |
|---|---|---|---|---|
| 4,936,424 A * | 6/1990 | Costa | ...................... | F16F 9/064 |
| | | | | 188/314 |
| 6,102,171 A | 8/2000 | Rottenberger et al. | | |
| 7,270,222 B1 * | 9/2007 | Aymar | .................... | F16F 9/461 |
| | | | | 188/285 |
| 2006/0124414 A1 * | 6/2006 | Hanawa | ................. | B62K 25/08 |
| | | | | 188/314 |
| 2007/0051573 A1 * | 3/2007 | Norgaard | .............. | F16F 9/3235 |
| | | | | 188/314 |
| 2009/0314592 A1 * | 12/2009 | Nygren | ..................... | F16F 9/06 |
| | | | | 188/266.6 |
| 2010/0170760 A1 * | 7/2010 | Marking | ................ | B60G 17/08 |
| | | | | 188/299.1 |
| 2010/0326780 A1 * | 12/2010 | Murakami | .............. | F16F 9/187 |
| | | | | 188/322.13 |
| 2012/0255822 A1 * | 10/2012 | Ito | .......................... | F16F 9/325 |
| | | | | 188/314 |
| 2014/0054122 A1 * | 2/2014 | Coaplen | ................ | F16F 9/3257 |
| | | | | 188/322.13 |
| 2015/0211595 A1 * | 7/2015 | Ikeda | ..................... | F16F 9/185 |
| | | | | 188/314 |

FOREIGN PATENT DOCUMENTS

| | | | |
|---|---|---|---|
| JP | 2003-172393 A | 6/2003 | |
| JP | 2012-122575 A | 6/2012 | |
| JP | 2013-194763 A | 9/2013 | |
| JP | 2013-228092 A | 11/2013 | |
| WO | WO-0052353 A1 * | 9/2000 | ............. F16F 9/512 |

* cited by examiner

SHOCK ABSORBER

CROSS REFERENCE TO PRIOR APPLICATION

This application is a National Stage Patent Application of PCT International Patent Application No. PCT/JP2016/066383 (filed on Jun. 2, 2016) under 35 U.S.C. § 371, which claims priority to Japanese Patent Application No. 2015-117081 (filed on Jun. 10, 2015), which are all hereby incorporated by reference in their entirety.

TECHNICAL FIELD

The present invention relates to a shock absorber.

BACKGROUND ART

Conventionally, as disclosed in FIG. 5 of JP 2003-172393 A, an example of a shock absorber for a vehicle is a shock absorber including a damping passage connecting two chambers filled with fluid such as working oil to each other, a leaf valve opening/closing the damping passage, a bypass passage connecting the two chambers to each other by bypassing the leaf valve, and a needle valve throttling the bypass passage. In a low speed region, in which the shock absorber extends or compresses at low speed, the differential pressure of the two chambers does not reach the valve opening pressure of the leaf valve, and the fluid thus passes through the bypass passage to move from one chamber to the other chamber. Hence, as illustrated in FIG. 7, in the low speed region, characteristics of a damping force to speed (damping force characteristics) are characteristics specific to an orifice (orifice characteristics), in which the damping force is proportional to the square of the speed. On the other hand, in a high speed region, since the leaf valve is opened, the damping force characteristics of the shock absorber are changed to characteristics specific to the leaf valve (valve characteristics), in which the damping force is proportional to the speed.

SUMMARY OF THE INVENTION

For example, in the shock absorber described in JP 2003-172393 A, a base valve device, which is a compression-side damping force generating device, can change the position of the needle valve in an axial direction to change the flow passage area of the bypass passage. In such a shock absorber, in a case in which, in the low speed region, the damping force is to be increased rapidly along with an increase of the speed, the flow passage area of the bypass passage may be changed to be small. However, this fosters a great change of a slope of a characteristic line in which the characteristics change from the orifice characteristics to the valve characteristics at an inflection point Y (FIG. 7), which is a transition point on the characteristic line. Thus, when the speed changes at the inflection point Y, the damping force characteristics are changed greatly, which causes an occupant to perceive a shock and feel poor ride quality. Also, to avoid this, when the flow passage area of the bypass passage is increased, and the slope of the characteristic line before reaching the inflection point Y is made to be gentle, this can alleviate the aforementioned shock but will lead to lack of the damping force in an ultra-low speed region and poor ride quality.

To deal with the above problem, an object of the present invention is to provide a shock absorber enabling a shock at the time of transition from a low speed region to a high speed region to be reduced without impairing ride quality in an ultra-low speed region.

To solve the above problem, in a shock absorber, a throttle valve such as an extension-side throttle valve and a compression-side throttle valve bypassing a main valve such as an extension-side main valve and a compression-side main valve includes a housing including a valve seat provided at one end thereof in an axial direction, a case inserted in the housing to enable a position thereof in the housing in the axial direction to be adjusted, a valve body movably inserted at one end thereof
in the case toward the valve seat and restricted from moving to a side of the valve seat in the case, and an elastic member biasing the valve body to the side of the valve seat.

DESCRIPTION OF EMBODIMENTS

Hereinbelow, embodiments of the present invention will be described with reference to the drawings. Equal reference signs provided in several figures represent equal components.

Figure 1:
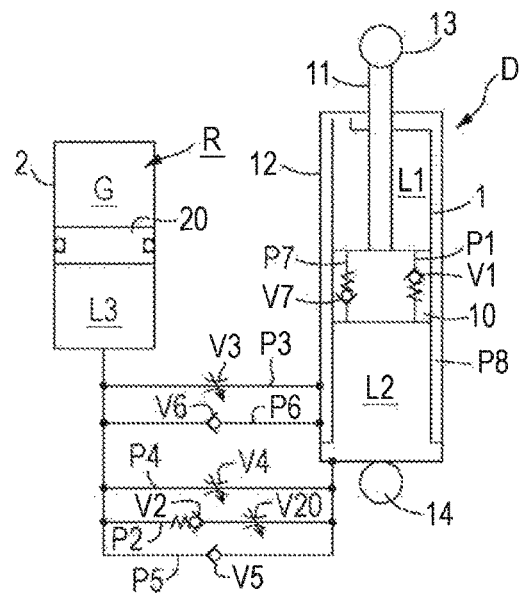
FIG. 1 is a circuit diagram of a shock absorber according to an embodiment of the present invention.

As illustrated in FIG. 1, a shock absorber D according to an embodiment of the present invention is provided between a vehicle body and a wheel of a vehicle and includes a cylinder 1, a piston 10 slidably inserted in the cylinder 1, a rod 11 connected at one end thereof to the piston 20 and extending at another end thereof to the outside of the cylinder 1, an outer tube 12 arranged at the outer circumference of the cylinder 1, a tank 2 provided outside the cylinder 1 and the outer tube 12, and a free piston 20 slidably inserted in the tank 2. Attaching members 23 and 14 are provided at the upper end of the rod 11 in FIG. 1 and on the lower side of the cylinder 1 in FIG. 1. The attaching member 13 on the side of the rod 11 is connected to the vehicle body while the attaching member 14 on the side of the cylinder 1 is connected to the wheel axis. Accordingly, when a shock is applied to the wheel due to an uneven road, the rod 11 proceeds into and recedes from the cylinder 1 to cause the shock absorber D to extend and compress.

In the cylinder 1 are provided an extension-side chamber L1 on the side of the rod 11 and a compression-side chamber L2 on the side of the piston 10 filled with liquid such as working oil. The chambers are separated by the piston 10. Also, in the tank 2 is provided a reservoir R which reserves liquid adapted to compensate for a change in the inner capacity of the cylinder 1 corresponding to the volume of the rod 11 when the rod 11 proceeds into and recedes from the cylinder 1 and for a change in the volume of the liquid caused by a temperature change. The reservoir R is separated by the free piston 20 into a liquid reserving chamber L3 filled with the liquid and a gas chamber G enclosing gas. Also, an outer circumferential passage P8, in which the liquid flows, is provided in a tubular space between the cylinder 1 and the outer tube 12. One end of the outer circumferential passage P8 opens to the extension-side chamber L1 to cause the outer circumferential passage P8 and the extension-side chamber L1 to communicate with each other at all times. In the present embodiment, although the liquid such as the working oil is used as fluid adapted to generate a damping force, gas may be used.

The extension-side chamber L1 and the compression-side chamber L2 formed in the cylinder 1 communicate with each other via an extension-side first damping passage P1 and a compression-side flow dividing passage P7. The extension-side first damping passage P1 is provided with an extension-side main valve V1 while the compression-side flow dividing passage P7 is provided with a compression-side flow dividing valve V7. When the shock absorber D extends, and the pressure of the extension-side chamber L1 is higher than the pressure of the compression-side chamber L2 by a predetermined value, the extension-side main valve V1 opens the extension-side first damping passage P1 to allow flow of the liquid from the extension-side chamber L1 to the compression-side chamber L2 and give resistance to the flow and to block flow of the liquid in the reverse direction. When the shock absorber D compresses, and the pressure of the compression-side chamber L2 is higher than the pressure of the extension-side chamber L1 by a predetermined value, the compression-side flow dividing valve V7 opens the compression-side flow dividing passage P7 to allow flow of the liquid from the compression-side chamber L2 to the extension-side chamber L1 and give resistance to the flow and to block flow of the liquid in the reverse direction.

Also, the outer circumferential passage P8 formed between the cylinder 1 and the outer tube 12 and the liquid reserving chamber L3 formed in the tank 2 are connected via an extension-side second damping passage P3 and a compression-side suction passage P6. Since the outer circumferential passage P8 communicates with the extension-side chamber L1 at all times, the extension-side second damping passage P3 and the compression-side suction passage P6 allow the extension-side chamber L1 and the liquid reserving chamber L3 to communicate with each other. The extension-side second damping passage P3 is provided with an extension-side throttle valve V3 while the compression-side suction passage P6 is provided with a compression-side check valve V6. The extension-side throttle valve V3 throttles the extension-side second damping passage P3, forms an orifice O (FIG. 5) in the middle of the extension-side second damping passage P3, and can change the flow passage area of the orifice O. When the shock absorber D compresses, the compression-side check valve V6 opens the compression-side suction passage P6 to allow flow of the liquid from the liquid reserving chamber L3 to the extension-side chamber 11 and to block flow of the liquid in the reverse direction.

Also, the compression-side chamber L2 formed in the cylinder 1 and the liquid reserving chamber L3 formed in the tank 2 are connected via a compression-side first damping passage P2, a compression-side second damping passage P4, and an extension-side suction passage P5. The compression-side first damping passage P2 is provided with a compression-side main valve V2 and an adjusting valve V20 in series, the compression-side second damping passage P4 is provided with a compression-side throttle valve V4, and the extension-side suction passage P5 is provided with an extension-side check valve V5. When the shock absorber D compresses, and the pressure of the compression-side chamber L2 is higher than the pressure of the liquid reserving chamber L3 by a predetermined value, the compression-side main valve V2 opens the compression-side first damping passage P2 to allow flow of the liquid from the compression-side chamber L2 to the liquid reserving chamber L3 and give resistance to the flow and to block flow of the liquid in the reverse direction. The adjusting valve V20 connected in series with the compression-side main valve V2 can change the flow passage area of the compression-side first damping passage P2. The compression-side throttle valve V4 throttles the compression-side second damping passage P4, forms the orifice O (FIG. 5) in the middle of the compression-side second damping passage P4, and can change the flow passage area of the orifice O. When the shock absorber D expands, the extension-side check valve V5 opens the extension-side suction passage P5 to allow flow of the liquid from the liquid reserving chamber L3 to the compression-side chamber L2 and to block flow of the liquid in the reverse direction.

Next, a specific configuration of the shock absorber D according to the present embodiment will be described.

Figure 2:
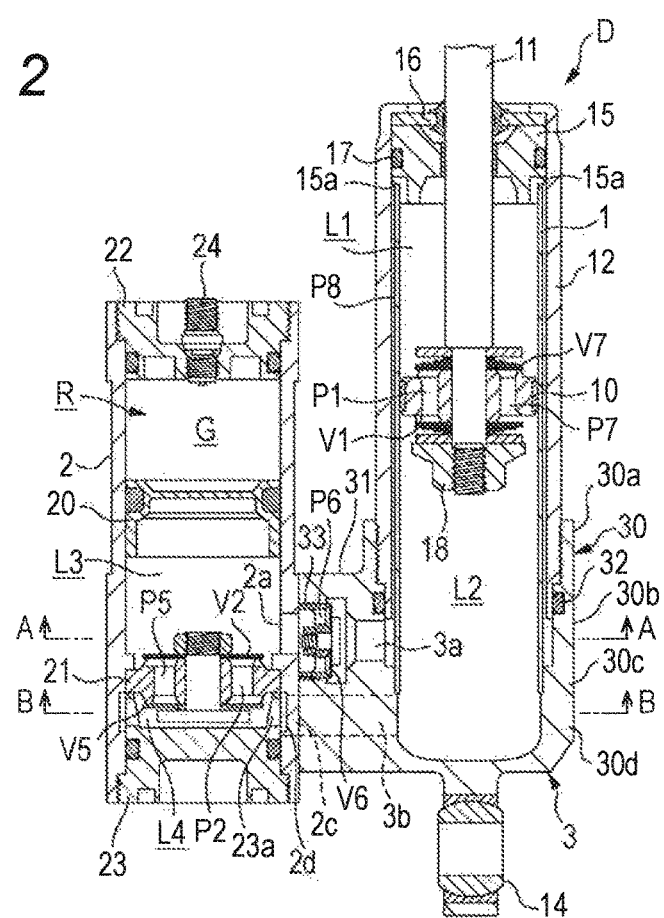
FIG. 2 is a longitudinal cross-sectional view specifically illustrating the shock absorber according to the embodiment of the present invention.

As illustrated in FIG. 2, in the present embodiment, the cylinder 1 and the outer tube 12 are formed in tubular shapes and are doubly arranged so that center lines penetrating the centers thereof may overlap with each other. At the upper ends of the cylinder 1 and the outer tube 12 in FIG. 2, a rod guide 15 pivotally supporting the rod 11 to be movable in an axial direction is secured. An annular seal member 16 is piled on the rod guide 15 to close the outer circumference of the rod 11 in a liquid-tight manner. A space between the rod guide 15 and the outer tube 12 is closed by an annular O ring 17. This prevents the liquid in the cylinder 2 and the outer tube 12 from leaking from the upper ends of the cylinder 1 and the outer tube 12 in FIG. 2 to the external air side. Also, at the lower portion of the rod guide 15 in FIG. 2, a groove 15a forming a space between the cylinder 1 and the rod guide 15 is provided. This enables the extension-side chamber L1 and the outer circumferential passage P8 to communicate with each other at all times and enables the liquid to flow between the extension-side chamber L1 and the outer circumferential passage P8. On the other hand, at the lower ends of the cylinder 1 and the outer tube 12 in FIG. 2, a connecting member 3 connecting the cylinder 1 and the outer tube 12 to the tank 2 is provided. The attaching member 14 on the side of the cylinder 1 is provided on the connecting member 3.

The piston 10 is slidably inserted in the cylinder 1 and is secured to the lower end of the rod 11 in FIG. 2 by a lock nut 18. The liquid is supplied between the piston 10 and the rod guide 15 to form the extension-side chamber L1 while the liquid is supplied between the piston 10 and the connecting member 3 to form the compression-side chamber L2. Since the lower end of the cylinder 1 in FIG. 2 projects downward from the outer tube 12 and is fitted in the connecting member 3, the compression-side chamber L2 does not directly communicate with the outer circumferential passage P8 but communicates with the outer circumferential passage P8 via the extension-side chamber L1.

The piston 10 is provided with a plurality of holes (no reference sign provided) penetrating the piston 10 in the axial direction and connecting the extension-side chamber L1 to the compression-side chamber L2, and these holes constitute the extension-side first damping passage P1 and the compression-side flow dividing passage P7. In the present embodiment, each of the extension-side main valve V1 opening/closing the extension-side first damping passage P1 and the compression-side flow dividing valve V7 opening/closing the compression-side flow dividing passage P7 is configured to include a plurality of leaf valves laminated in the axial direction.

The extension-side main valve V1 is provided on the lower side of the piston 10 in FIG. 2 to close the exit of the extension-side first damping passage P1. The entrance of the extension-side first damping passage P1 is not closed by the compression-side flow dividing valve V7 and is opened to the extension-side chamber L1 at all times. When the shock absorber D extends, the extension-side chamber L1 is pressurized by the piston 10, and the pressure of the extension-side chamber L1 is higher than the pressure of the compression-side chamber L2 by a predetermined value, the extension-side main valve V1 bends the outer circumference thereof to the lower side in FIG. 2 and opens the extension-side first damping passage P1. Conversely, when the shock absorber D compresses, the extension-side main valve V1 is not opened and keeps a state where the extension-side first damping passage P1 is closed.

The compression-side flow dividing valve V7 on the other side is provided on the upper side of the piston 10 in FIG. 2 to close the exit of the compression-side flow dividing passage P7. The entrance of the compression-side flow dividing passage P7 is not closed by the extension-side main valve V1 and is opened to the compression-side chamber L2 at all times. When the shock absorber D compresses, the compression-side chamber L2 is pressurized by the piston 10, and the pressure of the compression-side chamber L2 is higher than the pressure of the extension-side chamber L1 by a predetermined value, the compression-side flow dividing valve V7 bends the outer circumference thereof to the upper side in FIG. 2 and opens the compression-side flow dividing passage P7. Conversely, when the shock absorber D extends, the compression-side flow dividing valve V7 is not opened and keeps a state where the compression-side flow dividing passage P7 is closed.

In the present embodiment, each of the extension-side main valve V1 and the compression-side flow dividing valve V7 is configured to include the plurality of leaf valves, and each of the leaf valves is an annular thin plate. Thus, even when the extension-side main valve V1 and the compression-side flow dividing valve V7 are attached to the piston 10, the extension-side main valve V1 and the compression-side flow dividing valve V7 are not bulky in the axial direction. This can prevent the shock absorber D from being bulky in the axial direction and provide favorable mounting performance of the shock absorber D on the vehicle. However, each of the extension-side main valve V1 and the compression-side flow dividing valve V7 may be another valve (such as a poppet valve) instead of the leaf valve. Also, providing the compression-side flow dividing passage P7 enables the liquid to be supplied to the extension-side chamber L1 from both the compression-side flow dividing passage P7 and the compression-side suction passage P6 when the shock absorber D compresses, and the extension-side chamber L1 is enlarged. Accordingly, the flow rate of the liquid passing through the compression-side suction passage P6 can be decreased, and the size increase of the compression-side check valve V6 provided in the compression-side suction passage P6 can be prevented. However, the compression-side flow dividing passage P7 may be dispensed with, and the liquid may be supplied to the extension-side chamber L1 from the compression-side suction passage P6 when the extension-side chamber L1 is enlarged.

The tank 2 provided outside the cylinder 1 and the outer tube 12 is formed in a tubular shape and is provided horizontally to the cylinder 1 and the outer tube 12 in the present embodiment. Although the cylinder 1 and the tank 2 may be provided vertically to each other, the aforementioned arrangement can further prevent the shock absorber D from being bulky in the axial direction and provide more favorable mounting performance of the shock absorber D on the vehicle than the vertical arrangement. Also, in a case in which the cylinder 1 and the tank 2 are arranged vertically to each other, the cylinder 1 and the tank 2 may be formed seamlessly and integrally. Also, the separation-type tank 2 according to the present embodiment may be dispensed with, an outer shell may be provided on the outer circumference of the outer tube 12, and a space between the outer tube 12 and the outer shell may be used as the reservoir R.

Upper and lower openings of the tank 2 in FIG. 2 are closed by caps 22 and 23, respectively. Between the caps 22 and 23 in the tank 2, the free piston 20 is slidably inserted, and a valve disk 21 is secured in the tank 2 by the lower cap 23. Gas is enclosed between the free piston 20 and the upper cap 22 to form the gas chamber G while liquid is supplied between the free piston 20 and the valve disk 21 to form the liquid reserving chamber L3. To the upper cap 22, an air valve 24 is attached. By connecting a hose or the like for gas supply to the air valve 24, the internal pressure of the gas chamber G can be adjusted. Meanwhile, although the liquid reserving chamber L3 and the gas chamber G are separated by the free piston 20 in the present embodiment, the liquid reserving chamber L3 and the gas chamber G may be separated by another member (such as a bladder and a bellows) as long as extension and compression of the gas chamber G when the shock absorber D extends and compresses can be allowed.

Figure 3:
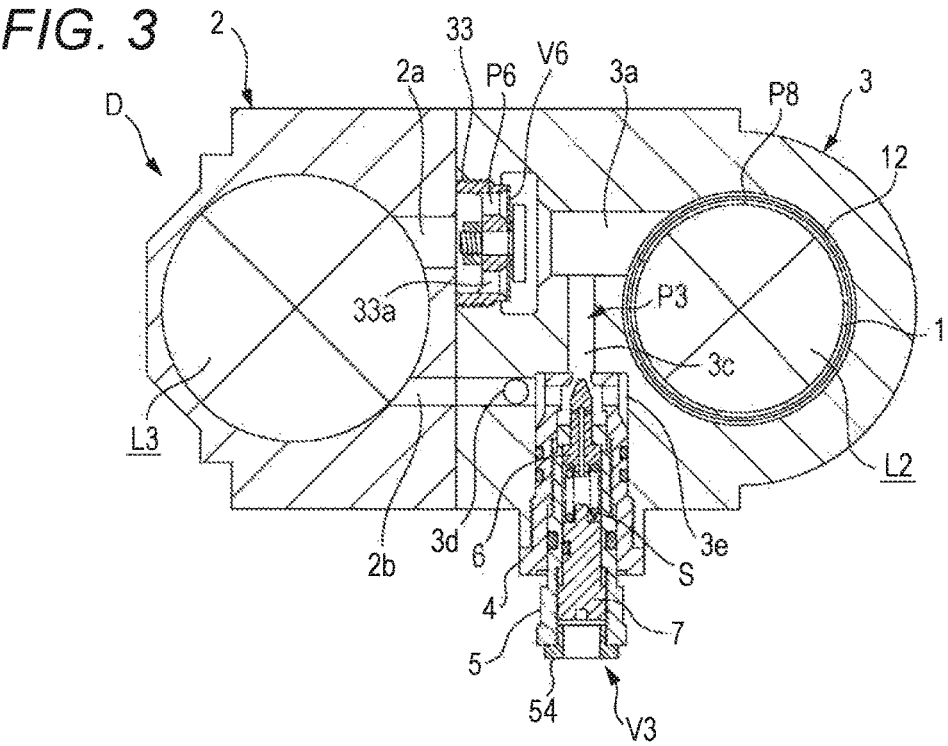
FIG. 3 is a cross-sectional view along the line AA specifically illustrating the shock absorber according to the embodiment of the present invention and omitting the inside of a tank and the inside of a cylinder.
Figure 4:
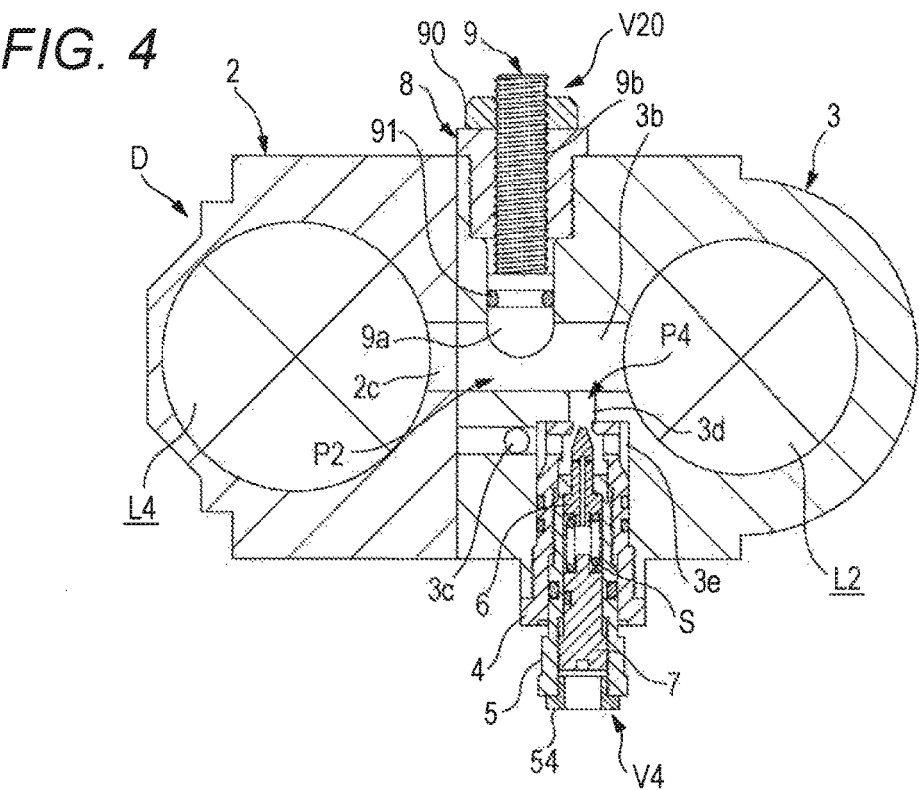
FIG. 4 is a cross-sectional view along the line BB specifically illustrating the shock absorber according to the embodiment of the present invention and omitting the inside of the tank and the inside of the cylinder.

Also, at the lateral portion of the tank 2 on the side of the cylinder 1 are provided first, second, and third holes 2a, 2b, and 2c enabling the liquid to move between the tank 2 and the compression-side chamber L2 or between the tank 2 and the outer circumferential passage P8 as illustrated in FIGS. 3 and 4. Care is taken to prevent the holes 2a, 2b, and 2c from being throttled. The first and second holes 2a and 2b are provided further on the upper side than the valve disk 21 approximately horizontally to each other and are opened to the liquid reserving chamber L3 (FIG. 3). The third hole 2c is provided on the lower side of the valve disk 21 and communicates with the compression-side chamber L2 via a space L4 between the lower cap 23 and the valve disk 21, a hole 23a formed in the lower cap 23, and a below-mentioned second horizontal hole 3b formed in the connecting member 3 (FIGS. 2 and 4). In addition, on the inner circumference of the tank 2, an annular groove 2d is provided along the circumferential direction at a position at which the third hole 2c is opened (FIG. 2). Due to the groove 2d, an annular space is formed between the lower cap 23 and the tank 2. Thus, the third hole 2c and the hole 23a of the cap 23 communicate with each other via the space without the need for face-to-face arrangement of the third hole 2c and the hole 23a of the cap 23. Accordingly, alignment of the cap 23 in the circumferential direction is dispensed with.

As illustrated in FIG. 2, the valve disk 21 is provided with a plurality of holes (no reference sign provided) penetrating the valve disk 21 in the axial direction and connecting the liquid reserving chamber L3 to the space L4. The holes of the valve disk 21, the space L4, the hole 23a, the third hole 2c, and the second horizontal hole 3b are provided to constitute the compression-side first damping passage P2 and the extension-side suction passage P5 connecting the compression-side chamber L2 to the liquid reserving chamber L3. In the present embodiment, the compression-side main valve V2 opening/closing the compression-side first damping passage P2 is configured to include a plurality of leaf valves laminated in the axial direction, and the extension-side check valve V5 opening/closing the extension-side suction passage P5 is configured to include one or more leaf valves.

The compression-side main valve V2 is provided on the upper side of the valve disk 21 in FIG. 2 to close the exit of the compression-side first damping passage P2. The entrance of the compression-side first damping passage P2 is not closed by the extension-side check valve V5, is opened to the space L4 at all times, and communicates with the compression-side chamber L2. When the shock absorber D compresses, the compression-side chamber L2 is pressurized by the piston 10, and the pressure of the compression-side chamber L2 is higher than the pressure of the liquid reserving chamber L3 by a predetermined value, the compression-side main valve V2 bends the outer circumference thereof to the upper side in FIG. 2 and opens the compression-side first damping passage P2. Conversely, when the shock absorber D extends, the compression-side main valve V2 is not opened and keeps a state where the compression-side first damping passage P2 is closed.

The extension-side check valve V5 on the other side is provided on the lower side of the valve disk 21 in FIG. 2 to close the exit of the extension-side suction passage P5. The entrance of the extension-side suction passage P5 is not closed by the compression-side main valve V2 and is opened to the liquid reserving chamber L3 at all times. When the shock absorber D extends, and the compression-side chamber L2 is enlarged, the extension-side check valve V5 bends the outer circumference thereof to the lower side in FIG. 2 and opens the extension-side suction passage P5. Conversely, when the shock absorber D compresses, the extension-side check valve V5 does not open the extension-side suction passage P5 and keeps a state where the extension-side suction passage P5 is closed.

In the present embodiment, each of the compression-side main valve V2 and the extension-side check valve V5 is configured to include the leaf valves, and each of the leaf valves is an annular thin plate. Thus, even when the compression-side main valve V2 and the extension-side check valve V5 are attached to the valve disk 21, the compression-side main valve V2 and the extension-side check valve V5 are not bulky in the axial direction. This can prevent the tank 2 from being bulky in the axial direction and provide favorable mounting performance of the shock absorber D on the vehicle. However, each of the compression-side main valve V2 and the extension-side check valve V5 may be another valve (such as a poppet valve) instead of the leaf valve.

The connecting member 3 connecting the cylinder 1 and the outer tube 12 to the tank 2 includes a bottomed tubular cylinder-side connecting portion 30 connected to the cylinder 1 and the outer tube 12 and a tank-side connecting portion 31 extending from the cylinder-side connecting portion 30 to the side of the tank 2 and connected to the tank 2 with bolts or the like (not illustrated) as illustrated in FIG. 2. The inner circumference of the cylinder-side connecting portion 30 is decreased in diameter in three stages toward the deepest part. In the cylinder-side connecting portion 30, a part on the opening side having the longest inside diameter is a nut portion 30a, a part having the second longest inside diameter is a first diameter decrease portion 30b, a part having the third longest inside diameter is a second diameter decrease portion 30c, and a part having the shortest inside diameter is a third diameter decrease portion 30d.

The inner circumference of the nut portion 30a is provided with a screw groove, and the nut portion 30a is screwed with the outer circumference of the outer tube 12. The inner circumference of the first diameter decrease portion 30b is provided with an annular groove (no reference sign provided) along the circumferential direction. The first diameter decrease portion 30b closes the outer circumference of the outer tube 12 with an O ring 32 fitted in the annular groove to prevent the liquid in the outer tube 12 from leaking to the external air side. The outer tube 12 is further decreased in outside diameter at the lower end thereof in FIG. 2 than at the other parts, and the lower end is fitted with the first diameter decrease portion 30b. The first diameter decrease portion 30b is adapted to extend downward from the lower end of the outer tube 12 in FIG. 2 when the outer tube 12 is screwed into the connecting member 3 until the step on the outer circumference of the outer tube 12 abuts on the step between the nut portion 30a and the first diameter decrease portion 30b. Also, the cylinder 1 extends downward in FIG. 2 from the outer tube 12 and is fitted with the inner circumference of the second diameter decrease portion 30c, and the lower end of the cylinder 1 in FIG. 2 abuts on the step between the second diameter decrease portion 30c and the third diameter decrease portion 30d.

The connecting member 3 is further provided with a first horizontal hole 3a connecting a space between a part of the first diameter decrease portion 30b projecting downward in FIG. 2 from the outer tube 12 and the cylinder 1 to the first hole 2a of the tank 2, a second horizontal hole 3b extending from the inner circumferential end of the third diameter decrease portion 30d to the third hole 2c of the tank 2, a first branch hole 3c (FIG. 3) branching from the first horizontal hole 3a and communicating with the second hole 2b of the tank 2, and a second branch hole 3d (FIGS. 4 and 3) branching from the second horizontal hole 3b and connected to the middle of the first branch hole 3c (FIG. 4). In FIG. 4, a part of the second branch hole 3d goes over the opening on the side of the first branch hole 3c and extends to the side of the tank 2, and the end of the part is closed by the side surface of the tank 2. Accordingly, the liquid flowing from the second horizontal hole 3b to the second branch hole 3d moves to the liquid reserving chamber L3 via the first branch hole 3c and the second hole 2b.

As illustrated in FIG. 3, a valve disk 33 separating the outer circumferential passage P8 from the liquid reserving chamber L3 is provided at a part of the first horizontal hole 3a located further on the side of the liquid reserving chamber L3 than a branch point of the first branch hole 3c in the first horizontal hole 3a. The valve disk 33 is provided with a plurality of holes 33a penetrating the valve disk 33 in the axial direction. The compression-side suction passage P6 including the holes 33a of the valve disk 33, the first hole 2a, and the first horizontal hole 3a and causing the extension-side chamber L1 to communicate with the liquid reserving chamber L3 via the outer circumferential passage P8 is configured. In the present embodiment, the compression-side check valve V6 opening/closing the compression-side suction passage P6 is configured to include one or more leaf valves laminated in the axial direction.

The compression-side check valve V6 is provided on the right side of the valve disk 33 in FIG. 3 to close the exits of the holes 33a. The entrances of the holes 33a are opened to the side of the liquid reserving chamber L3 at all times. When the shock absorber D compresses, and the extension-side chamber L1 is enlarged, the compression-side check valve V6 bends the outer circumference thereof to the right side in FIG. 3 and opens the compression-side suction passage P6. When the shock absorber D extends, the compression-side check valve V6 does not open the compression-side suction passage P6 and keeps a state where the compression-side suction passage P6 is closed.

In the present embodiment, the compression-side check valve V6 is configured to include the leaf valves, and each of the leaf valves is an annular thin plate. Thus, even when the compression-side check valve V6 is attached to the valve disk 33, the compression-side check valve V6 is not bulky in the axial direction. Accordingly, as illustrated in FIGS. 2 and 3, even when the compression-side check valve V6 is provided in the connecting member 3, the connecting member 3 can be prevented from being enlarged, and favorable mounting performance of the shock absorber D on the vehicle can be provided. However, the compression-side check valve V6 may be another valve (such as a poppet valve) instead of the leaf valve.

Also, as illustrated in FIG. 4, the adjusting valve V20 changing the flow passage area of the second horizontal hole 3b is provided at a part of the second horizontal hole 3b located further on the side of the liquid reserving chamber L3 (the side of the space L4) than a branch point of the second branch hole 3d in the second horizontal hole 3b. In the present embodiment, the adjusting valve V20 includes a tubular housing 8 secured on the connecting member 3, a valve body 9 screwed with the inner circumference of the housing 8, and a nut 90 locking the valve body 9. The valve body 9 includes a head 9a projecting from the housing 8 to the side of the second horizontal hole 3b and a screw shaft 9b connected to the head 9a and screwed in the housing 8. The outer circumference of the tip end of the head 9a is bent in a hemispherical shape. On the outer circumference of the terminal end of the head 9a, an O ring 91 is provided and can prevent the liquid flowing in the second horizontal hole 3b from leaking to the external air side. The nut 90 is screwed with the outer circumference of the screw shaft 9b projecting from the housing 8 to the external air side to prevent the valve body 9 from being misaligned with the housing 8 in the axial direction.

According to the above configuration, when the nut 90 is loosened to rotate the valve body 9 positively, the head 9a of the valve body 9 enters the second horizontal hole 3b, and the flow passage area of the second horizontal hole 3b is decreased. Conversely, when the valve body 9 is rotated negatively, the head 9a of the valve body 9 retracts from the second horizontal hole 3b, and the flow passage area of the second horizontal hole 3b is increased. As described above, since the second horizontal hole 3b constitutes a part of the compression-side first damping passage P2, adjustment of the adjusting valve V20 can cause the flow passage area of the compression-side first damping passage P2 to be changed. By operating the adjusting valve V20, the flow passage area of the compression-side first damping passage P2 is changed, and the damping force after the compression-side main valve V2 has been fully opened is changed. In the present embodiment, for convenience of this operation, care is taken to prevent the adjusting valve V20 from excessively decreasing the flow passage area of the second horizontal hole 3b.

In the present embodiment, since the adjusting valve V20 is provided on the side of the compression-side chamber L2, which is the upstream side of the compression-side main valve V2, the adjusting valve V20 can be attached to the connecting member 3, and the configuration of the shock absorber D can be simplified. However, the adjusting valve V20 may be provided on the downstream side of the compression-side main valve V2. Also, in the present embodiment, the adjusting valve V20 is located on the downstream side of the extension-side check valve V5 to cause the liquid that has passed the extension-side check valve V5 to pass the adjusting valve V20. In this case as well, as described above, since care is taken to prevent the second horizontal hole 3b from being excessively throttled by the adjusting valve V20, there is no concern about shortage of the liquid in the compression-side chamber L2 when the shock absorber D extends. However, the liquid that has passed the extension-side check valve V5 may directly flow into the compression-side chamber L2 without passing the adjusting valve V20, and the configuration of the adjusting valve V20 can arbitrarily be changed. Also, the adjusting valve V20 may become active before the compression-side main valve V2 is fully opened to the extent that shortage of the liquid in the compression-side chamber L2 does not occur.

As illustrated in FIG. 3, the first branch hole 3c, as well as the space between the cylinder 1 and the first diameter decrease portion 30b of the connecting member 3, the first horizontal hole 3a, and the second hole 2b, constitutes the extension-side second damping passage P3 connecting the extension-side chamber L1 to the liquid reserving chamber L3 via the outer circumferential passage P8. The extension-side throttle valve V3 throttling the extension-side second damping passage P3 is provided at a part of the first branch hole 3c located further on the side of the extension-side chamber L1 (the side of the outer circumferential passage P8) than a connection point to the second branch hole 3d in the first branch hole 3c. When the shock absorber D extends, and the extension-side chamber L1 is pressurized by the piston 10, the compression-side check valve V6 provided in the first horizontal hole 3a is kept closed. Thus, until the extension-side main valve V1 is opened, the liquid in the extension-side chamber L1 moves to the liquid reserving chamber L3 via the part of the first horizontal hole 3a located further on the side of the extension-side chamber L1 than the compression-side check valve V6, the first branch hole 3c, and the second hole 2b. In this manner, the liquid passing the extension-side second damping passage P3 can move from the extension-side chamber L1 to the liquid reserving chamber L3 without passing the extension-side main valve V1.

As illustrated in FIGS. 4 and 3, the second branch hole 3d, as well as the second horizontal hole 3b, the first branch hole 3c, and the second hole 2b, constitutes the compression-side second damping passage P4 connecting the compression-side chamber L2 to the liquid reserving chamber L3. The compression-side throttle valve V4 throttling the compression-side second damping passage P4 is provided in the middle of the second branch hole 3d. When the shock absorber D compresses, and the compression-side chamber L2 is pressurized by the piston 10, the liquid in the second horizontal hole 3b is prevented from moving to the side of the third hole 2c until the compression-side main valve V2 is opened. Thus, the liquid in the compression-side chamber L2 moves to the liquid reserving chamber L3 via the second horizontal hole 3b, the second branch hole 3d, the part of the first branch hole 3c located further on the side of the liquid reserving chamber L3 than the extension-side throttle valve V3, and the second hole 2b. In this manner, the liquid passing the compression-side second damping passage P4 can move from the compression-side chamber L2 to the liquid reserving chamber L3 without passing the compression-side main valve V2 and the adjusting valve V20.

In the present embodiment, each of the extension-side throttle valve V3 and the compression-side throttle valve V4 has a common configuration and includes a tubular housing 4 secured on the connecting member 3, a tubular case 5 screwed with the inner circumference of the housing 4, a valve body 6 slidably inserted in the case 5, a spring holder 7 screwed with the external air side of the valve body 6 in the case 5, and a coil spring S provided between the valve body 6 and the spring holder 7 (FIGS. 3 and 4). Also, the connecting member 3 is provided with attaching holes 3e to which the extension-side throttle valve V3 and the compression-side throttle valve V4 are attached from the outer surface of the connecting member 3 to the first branch hole 3c and the second branch hole 3d, respectively.

Figure 5:
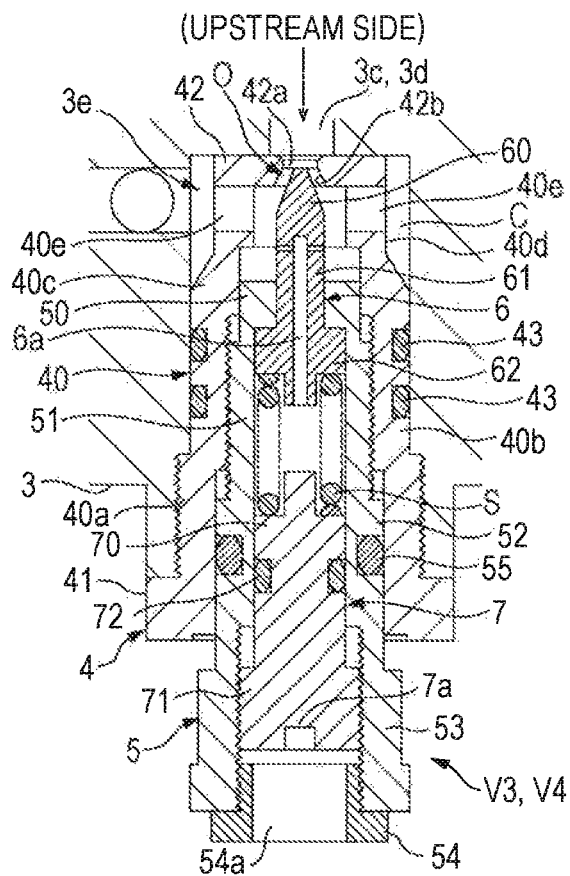
FIG. 5 is an enlarged view of an extension-side throttle valve in FIG. 3 or a compression-side throttle valve in FIG. 4.

As illustrated in FIG. 5, the housing 4 includes a tubular housing main body 40 housing the case 5, an annular brim 41 projecting from one end of the housing main body 40 in the axial direction to the outer circumferential side, and an annular seat portion 42 projecting from the other end of the housing main body 40 to the inner circumferential side. The seat portion 42 includes a center hole 42a penetrating the center part of the seat portion 42 in the axial direction. The inside diameter of the lower part of the seat portion 42 in FIG. 5 is broadened toward the lower end in a truncated conical shape, and the inner circumferential surface of the truncated cone is a valve seat 42b.

The outer circumference of the housing main body 40 is decreased in diameter in two stages toward the seat portion 42. In the outer circumference of the housing main body 40, a screw groove is formed at the lower part in FIG. 5, and annular grooves going along the circumferential direction are formed at the center part. The housing 4 is screwed into the attaching hole 3e from the side of the seat portion 42 and is secured on the connecting member 3. Also, annular O rings 43 fitted in the annular grooves close the outer circumference of the housing 4 to prevent the liquid in the connecting member 3 from leaking to the external air side.

Also, the inner circumference of the housing main body 40 is decreased in diameter in three stages toward the seat portion 42. In the housing main body 40, a part on the external air side having the longest inside diameter is a first support portion 40a, a part having the second longest inside diameter is a housing nut portion 40b, a part having the third longest inside diameter is a second support portion 40c, and a part having the shortest inside diameter is a communication portion 40d. In the housing 4, a part of the outer circumference of the housing main body 40 from the communication portion 40d to the seat portion 42 is formed to have a shorter diameter than the other parts, and an annular space C is formed between the part and the connecting member 3. The communication portion 40d of the housing main body 40 is provided with a hole 40e penetrating the communication portion 40d. Thus, the liquid flowing in the first branch hole 3c or the second branch hole 3d is not blocked at the housing 4 but passes through the center hole 42a of the seat portion 42, the inside of the communication portion 40d, the hole 40e, and the space C in this order and returns to the first branch hole 3c or the second branch hole 3d. In addition, in the present embodiment, since the annular space C is provided, communication of the first branch hole 3c or the second branch hole 3d with the hole 40e is not prevented without alignment of the housing 4 in the circumferential direction. Also, the inner circumference of the housing nut portion 40b is provided with a screw groove.

The tubular case 5 screwed with the inner circumference of the housing 4 includes a stopper portion 50 sliding in contact with the inner circumferential surface of the second support portion 40c of the housing 4, a case screw shaft portion 51 screwed with the inner circumference of the housing nut portion 40b, a case sliding portion 52 sliding in contact with the inner circumferential surface of the first support portion 40a of the housing 4, and a case nut portion 53 provided on the inner circumference thereof with a screw groove. The case nut portion 53 projects from the housing 4 to the external air side. When the case 5 is rotated while the case nut portion 53 is being gripped, the case 5 moves into the housing 4 in the axial direction. When the rotation of the case 5 is stopped, the case 5 stops at the position. The outer circumference of the case sliding portion 52 is provided with an annular groove along the circumferential direction. An annular O ring 55 fitted in the annular groove closes the outer circumference of the case 5 and prevents the liquid in the connecting member 3 from leaking to the external air side. Also, the inner circumference of the case screw shaft portion 51 and the case sliding portion 52 is uniform and is shorter than the inner circumference of the case nut portion 53 and longer than the inner circumference of the stopper portion 50. Also, a cap 54 is screwed with the end of the case nut portion 53 on the external air side and restricts movement of the spring holder 7 screwed in the case 5 to the lower side in FIG. 5.

The valve body 6 slidably inserted in the case 5 is a needle valve and includes a truncated conical head portion 60 tapered toward the tip end, a shaft portion 61 connected to the terminal end of the head portion 60, and a flange portion 62 extending outward from the outer circumference of the shaft portion 61. The flange portion 62 slides in contact with the inner circumferential surface of the case screw shaft portion 51, the shaft portion 61 slides in contact with the inner circumferential surface of the stopper portion 50 of the case 5, and the head portion 60 projects from the case 5 and is opposed to the valve seat 42b. In this manner, the valve body 6 can move in the case 5 in the axial direction while the shaft portion 61 and the flange portion 62 are supported by the case 5. When the valve body 6 moves in the case 5 and approaches the valve seat 42b, the flow passage area of the orifice O formed between the valve seat 42b and the head portion 60 is decreased. Thus, the resistance when the liquid moves in the first branch hole 3c or the second branch hole 3d is increased. Conversely, when the valve body 6 moves in the case 5 and moves away from the valve seat 42b, the flow passage area of the orifice O formed between the valve seat 42b and the head portion 60 is increased. Thus, the resistance when the liquid moves in the first branch hole 3c or the second branch hole 3d is decreased.

Also, since the outside diameter of the flange portion 62 of the valve body 6 is longer than the inside diameter of the stopper portion 50 of the case 5, movement of the valve body 6 to the side of the valve seat 42b is restricted by the stopper portion 50. In addition, since the valve body 6 is biased to the side of the valve seat 42b by the coil spring S, the state where the flange portion 62 abuts on the stopper portion 50 is maintained until a force of pressing the valve body 6 downward in FIG. 5 resulting from the pressure on the upstream side of the valve body 6 exceeds the biasing force of the coil spring S. When the force of pressing the valve body 6 downward in FIG. 5 resulting from the pressure on the upstream side of the valve body 6 exceeds the biasing force of the coil spring S, the valve body 6 retracts in accordance with the pressing force, and the flow passage area of the orifice O is thus increased.

Figure 6:
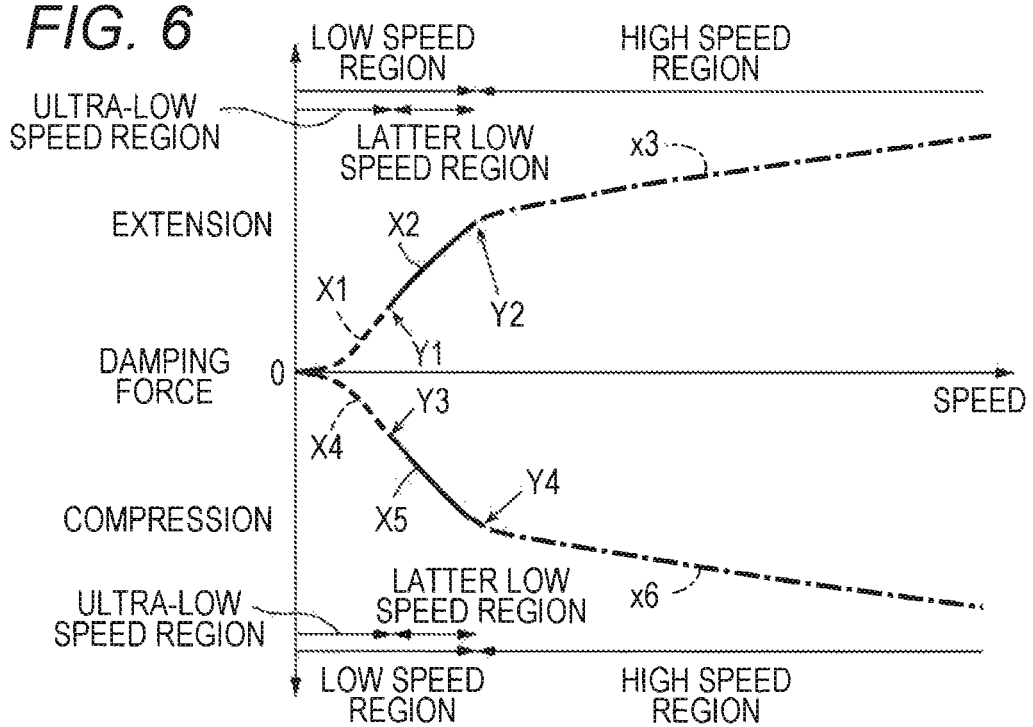
FIG. 6 is a graph illustrating damping force characteristics of the shock absorber according to the embodiment of the present invention.
Figure 7:
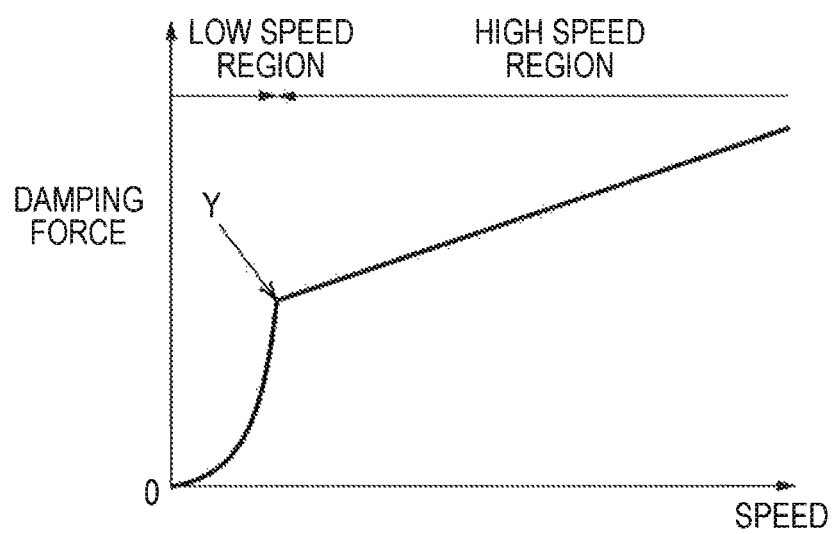
FIG. 7 is a graph illustrating damping force characteristics of a conventional shock absorber.

According to the above configuration, in an ultra-low speed region before the valve body 6 starts retracting in a low speed region until the extension-side main valve V1 or the compression-side main valve V2 is opened, the flow passage area of the orifice O is uniform, and the damping force based on orifice characteristics, in which the damping force is proportional to the square of the speed, is generated (dashed lines X1 and X4 in FIG. 6). Also, in a speed region after the valve body 6 starts retracting (hereinbelow referred to as a latter low speed region) in the low speed region, the flow passage area of the orifice O is gradually increased in accordance with the speed, and the damping force based on valve characteristics, in which the damping force is proportional to the speed, is generated (solid lines X2 and X5 in FIG. 6). In this latter low speed region, the slope of the characteristic line can be gentler than that in the ultra-low speed region. Meanwhile, in the present embodiment, since the retracting amount of the valve body 6 gradually increases in accordance with the speed, the damping force characteristics in the latter low speed region are the valve characteristics. However, depending on the setting of the coil spring S, the valve body 6 can retract to the maximum immediately after the valve body 6 starts retracting. In this case, the damping force characteristics in the latter low speed region are the orifice characteristics. In this case as well, since the flow passage area of the orifice O in the latter low speed region is larger than that in the ultra-low speed region, the slope of the characteristic line is gentle.

In addition, as described above, the case 5 can move in the housing 4. Accordingly, the flow passage area of the orifice O in the ultra-low speed region when the flange portion 62 of the valve body 6 and the stopper portion 50 of the case 5 abut on each other (hereinbelow referred to as an initial flow passage area) can be changed by movement of the case 5. Specifically, when the case 5 is rotated positively and moves toward the side of the seat portion 42, the initial flow passage area of the orifice O is decreased, and the damping force to the speed in the ultra-low speed region can be increased. Conversely, when the case 5 is rotated negatively and retracts away from the seat portion 42, the initial flow passage area of the orifice O is increased, and the damping force to the speed in the ultra-low speed region can be decreased.

Also, the valve body 6 is provided with a communication hole 6a penetrating from the lower end of the shaft portion 61 in FIG. 5 to the lateral side of the shaft portion 61, and the communication hole 6a connects the upper part of the stopper portion 50 to the lower part thereof in FIG. 5. Thus, even when the valve body 6 moves in the case 5 in the axial direction, and the capacity of the space formed between the spring holder 7 and the stopper portion 50 is changed, the excess and deficiency of the liquid in the space can be compensated via the communication hole 6a. Also, by providing a throttle in the middle of the communication hole 6a, drastic movement of the valve body 6 can be restricted.

The spring holder 7 screwed in the case 5 includes a spring holder sliding portion 70 sliding in contact with the inner circumference of the case sliding portion 52 and a spring holder screw shaft portion 71 screwed with the inner circumference of the case nut portion 53. The outer circumference of the spring holder sliding portion 70 is provided with an annular groove along the circumferential direction. The spring holder sliding portion 70 closes the outer circumference of the spring holder 7 with an annular O ring 72 fitted in the annular groove to prevent the liquid in the connecting member 3 from leaking to the external air side. On the other hand, the end of the spring holder screw shaft portion 71 on the external air side is provided with an engaging groove 7a allowing a tool or the like that rotates the spring holder 7 to be engaged therewith, and the cap 54 is provided with a hole 54a penetrating the cap 54 in the axial direction. When the tool or the like is inserted from the hole 54a and rotates the spring holder 7 in the case 5, the spring holder 7 moves into the case 5 in the axial direction. When the rotation is stopped, the spring holder 7 stops at the position. More specifically, when the spring holder 7 is rotated positively in the case 5 and moves toward the side of the valve body 6, in the low speed region, inflection points Y1 and Y3 (FIG. 6), each of which is a point on the characteristic line in which a change from the orifice characteristics to the valve characteristics occurs, can be shifted to the high speed side. Conversely, when the spring holder 7 is rotated negatively in the case 5 and retracts away from the valve body 6, the coil spring S extends to cause the elastic force to be lowered, and the inflection points Y1 and Y3 (FIG. 6) can thus be shifted to the low speed side. Also, by replacing the coil spring S with another spring having a different spring constant, the slope of each of the characteristic lines (solid lines X2 and X5) in the latter low speed region can be changed.

Meanwhile, in the present embodiment, the coil spring S is used as an elastic member biasing the valve body 6 to the side of the valve seat 42b. However, another elastic member such as a disc spring and rubber may be used as an elastic member. Also, in the present embodiment, the case 5 is screwed with the inner circumference of the housing 4. When the case 5 is rotated into the housing 4, the case 5 moves into the housing 4 in the axial direction. When the rotation is stopped, the case 5 stops at the position. Accordingly, adjustment of the position of the case 5 in the housing 4 in the axial direction is easy. However, the position of the case 5 may be adjusted in a method other than screwing as long as the method enables the position of the case 5 in the housing 4 in the axial direction to be changed and enables the case 5 to stop at the changed position. Similarly, the spring holder 7 is screwed with the inner circumference of the case 5, and the position of the spring holder 7 in the case 5 in the axial direction is easy. However, the position of the spring holder 7 may be adjusted in a method other than screwing as long as the method enables the position of the spring holder 7 in the case 5 in the axial direction to be changed and enables the spring holder 7 to stop at the changed position.

Also, in the present embodiment, even in a state where the flange portion 62 abuts on the stopper portion 50 to restrict the valve body 6 from moving to the side of the valve seat 42b by means of the case 5, the valve body 6 slightly moves away from the valve seat 42b, and the orifice O is formed during the time. Accordingly, the shock absorber D generates the damping force in accordance with the initial flow passage area of the orifice O in the ultra-low speed region. However, in a case in which an orifice is formed by providing the leaf valve constituting the extension-side main valve V1 or the compression-side main valve V2 with a cut-out or providing the valve seat on which the leaf valve is seated with a stamp to generate the damping force in the ultra-low speed region in the orifice, the initial flow passage area of the orifice O formed by the extension-side throttle valve V3 or the compression-side throttle valve V4 may be set to zero.

Hereinbelow, operations of the shock absorber D according to the present embodiment will be described.

When the shock absorber D extends, the piston 10 moves upward in FIGS. 1 and 2 in the cylinder 1 to shrink the extension-side chamber L1 and enlarge the compression-side chamber L2. In the low speed region, in which the shock absorber D extends at low speed, the pressure does not reach the valve opening pressure of the extension-side main valve V1. Hence, the liquid in the shrunk extension-side chamber L1 does not pass through the extension-side first damping passage P1 but passes through the outer circumferential passage P8 and the extension-side second damping passage P3 to reach the liquid reserving chamber L3. In the extension-side low speed region, the shock absorber D generates the damping force resulting from the resistance of the extension-side throttle valve V3 when the liquid passes through the extension-side second damping passage P3. The damping force characteristics in the extension-side low speed region change around the inflection point Y1, at which the valve body 6 starts retracting after the valve body 6 is restricted from moving to the side of the valve seat 42b in the case 5 (FIG. 6).

In the ultra-low speed region in the extension-side low speed region, in which the speed of the valve body 6 does not reach the speed at which the valve body 6 starts retracting, the damping force characteristics of the shock absorber D are the orifice characteristics, in which the damping force is proportional to the square of the speed, as illustrated by the dashed line X in FIG. 6. When the valve body 6 starts retracting, the retracting amount of the valve body 6 gradually increases in accordance with the speed, and the flow passage area of the orifice O gradually increases. Thus, in the latter low speed region after the speed of the valve body 6 has reached the speed at which the valve body 6 starts retracting, the damping force characteristics of the shock absorber D are changed to the valve characteristics, in which the damping force is proportional to the speed, as illustrated by the solid line X2 in FIG. 6. The damping force in the ultra-low speed region can be adjusted by rotating the case 5 in the housing 4 to change the initial flow passage area of the orifice O. Also, the position of the inflection point Y1, which is a point of transition from the ultra-low speed region to the latter low speed region, can be adjusted by rotating the spring holder 7 in the case 5 to change the elastic force of the coil spring S.

Subsequently, when the extension speed of the shock absorber D increases and reaches the high speed region, the extension-side main valve V1 is opened, and the liquid in the shrunk extension-side chamber L1 passes through the extension-side first damping passage P1 and moves to the compression-side chamber L2. Thus, in the extension-side high speed region, the shock absorber D generates the damping force resulting from the resistance of the extension-side main valve V1 when the liquid passes through the extension-side first damping passage P1. The damping force characteristics in the extension-side high speed region are the valve characteristics, in which the damping force is proportional to the speed, as illustrated by a dashed-dotted line X3 in FIG. 6.

The slope of the characteristic line representing the damping force characteristics in the aforementioned latter low speed region (solid line X2) is greater than the slope of the characteristic line in the extension-side high speed region (dashed-dotted line X3) immediately after the latter low speed region and is gentler than the slope of the characteristic line in the ultra-low speed region (dashed line X1) immediately before the latter low speed region. Consequently, even when the damping force in the ultra-low speed region is increased for the purpose of improving the ride quality, the change of the damping force characteristics at an inflection point Y2, which is a point of transition from the low speed region to the high speed region on the characteristic line, is gentle. That is, even when the damping force in the ultra-low speed region is increased, the damping force characteristics are not changed greatly at the time of the transition from the low speed region to the high speed region. Accordingly, the ride quality in the ultra-low speed region is maintained, and the occupant can be free from perceiving a shock.

Also, when the shock absorber D extends, the extension-side check valve V5 is opened, and the liquid in the liquid reserving chamber L3 passes through the extension-side suction passage P5 and moves to the enlarged compression-side chamber L2. Also, when the shock absorber D extends, the inner capacity of the cylinder 2 increases to correspond to the volume of the rod 11 that has receded from the cylinder 1. The free piston 20 moves downward in FIGS. 1 and 2 to enlarge the gas chamber G, and the change in the inner capacity of the cylinder 1 can be compensated.

Conversely, when the shock absorber D compresses, the piston 10 moves downward in FIGS. 1 and 2 to shrink the compression-side chamber L2 and enlarge the extension-side chamber L1. In the low speed region, in which the shock absorber D compresses at low speed, the pressure does not reach the valve opening pressure of each of the compression-side main valve V2 and the compression-side flow dividing valve V7. Hence, the liquid in the shrunk compression-side chamber L2 does not pass through the compression-side first damping passage P2 and the compression-side flow dividing passage P7 but passes through the compression-side second damping passage P4 to reach the liquid reserving chamber L3. In the compression-side low speed region, the shock absorber D generates the damping force resulting from the resistance of the compression-side throttle valve V4 when the liquid passes through the compression-side second damping passage P4. The damping force characteristics in the compression-side low speed region change around the inflection point Y3, at which the valve body 6 starts retracting after the valve body 6 is restricted from moving to the side of the valve seat 42b in the case 5 (FIG. 6).

In the ultra-low speed region in the compression-side low speed region, in which the speed of the valve body 6 does not reach the speed at which the valve body 6 starts retracting, the damping force characteristics of the shock absorber D are the orifice characteristics, in which the damping force is proportional to the square of the speed, as illustrated by the dashed line X4 in FIG. 6. When the valve body 6 starts retracting, the retracting amount of the valve body 6 gradually increases in accordance with the speed, and the flow passage area of the orifice O gradually increases. Thus, in the latter low speed region after the speed of the valve body 6 has reached the speed at which the valve body 6 starts retracting, the damping force characteristics of the shock absorber D are changed to the valve characteristics, in which the damping force is proportional to the speed, as illustrated by the solid line X5 in FIG. 6. The damping force in the ultra-low speed region can be adjusted by rotating the case 5 in the housing 4 to change the initial flow passage area of the orifice O. Also, the position of the inflection point Y3, which is a point of transition from the ultra-low speed region to the latter low speed region, can be adjusted by rotating the spring holder 7 in the case 5 to change the elastic force of the coil spring S.

Subsequently, when the compression speed of the shock absorber D increases and reaches the high speed region, the compression-side main valve V2 is opened, and the liquid in the shrunk compression-side chamber L2 passes through the compression-side first damping passage P2 and moves to the liquid reserving chamber L3. Also, when the compression-side flow dividing valve V7 is opened, the liquid in the compression-side chamber L2 passes through the compression-side flow dividing passage P7 and moves to the extension-side chamber L1. Thus, in the compression-side high speed region, the shock absorber D generates the damping force resulting from the resistance of the compression-side main valve V2 when the liquid passes through the compression-side first damping passage P2. Also, in the compression-side high speed region, when the compression-side flow dividing valve V7 is opened, the shock absorber D generates the damping force resulting from the resistance of the compression-side flow dividing valve V7 when the liquid passes through the compression-side flow dividing passage P7. The damping force characteristics in the compression-side high speed region are the valve characteristics, in which the damping force is proportional to the speed, as illustrated by a dashed-dotted line X6 in FIG. 6.

The slope of the characteristic line representing the damping force characteristics in the aforementioned latter low speed region (solid line X5) is greater than the slope of the characteristic line in the compression-side high speed region (dashed-dotted line X6) immediately after the latter low speed region and is gentler than the slope of the characteristic line in the ultra-low speed region (dashed line X4) immediately before the latter low speed region. Consequently, even when the damping force in the ultra-low speed region is increased for the purpose of improving the ride quality, the change of the damping force characteristics at an inflection point Y4, which is a point of transition from the low speed region to the high speed region on the characteristic line, is gentle. That is, even when the damping force in the ultra-low speed region is increased, the damping force characteristics are not changed greatly at the time of the transition from the low speed region to the high speed region. Accordingly, the ride quality in the ultra-low speed region is maintained, and the occupant can be free from perceiving a shock.

Also, in the present embodiment, in the middle of the compression-side first damping passage P2, the adjusting valve V20, which changes the flow passage area of the compression-side first damping passage P2, is provided. Accordingly, the damping force after the compression-side main valve V2 is opened to the maximum can be changed by the adjusting valve V20.

Also, when the shock absorber D compresses, the compression-side check valve V6 is opened, and the liquid in the liquid reserving chamber L3 passes through the compression-side suction passage P6 and the outer circumferential passage P8 and moves to the enlarged extension-side chamber L1. Also, when the shock absorber D compresses, the inner capacity of the cylinder 1 decreases to correspond to the volume of the rod 11 that has proceeded into the cylinder 1. The free piston 20 moves upward in FIGS. 1 and 2 to shrink the gas chamber G, and the change in the inner capacity of the cylinder 1 can be compensated.

In the above description, the region of the extension/compression speed of the shock absorber D is divided into the low speed region and the high speed region, and the low speed region is further divided into the ultra-low speed region and the latter low speed region. The threshold value for each region can arbitrarily be set.

Hereinbelow, effects of the shock absorber D according to the present embodiment will be described.

In the present embodiment, the shock absorber D includes the tank 2 provided outside the cylinder 1 and having formed therein the reservoir R and the connecting member 3 connecting the cylinder 1 to the tank 2. The connecting member 3 is provided with the extension-side throttle valve V3, the compression-side throttle valve V4, and the adjusting valve V20.

According to the above configuration, the cylinder 1 and the tank 2 can be arranged horizontally to each other as illustrated in FIG. 2, or the cylinder 1 and the tank 2 can be arranged so that the center line of the cylinder 1 and the center line of the tank 2 may intersect with each other (including three-dimensional intersection). This can further prevent the shock absorber D from being bulky in the axial direction, and the cylinder 1 and the tank 2 are more easily arranged to be suitable for an attaching space of the shock absorber D than in a case in which the cylinder 1 and the tank 2 are integrated and are arranged in series. Also, unlike the cylinder 1 and the tank 2, the connecting member 3 can be dispensed with a sliding portion enabling the piston 10 or the free piston 20 to slide and is flexible about the shape. In addition, since the connecting member 3 connects the cylinder 1 to the tank 2, it is easy to form a passage connecting the cylinder 1 to the tank 2 in the connecting member 3. Accordingly, the connecting member 3 is suitable for including the extension-side throttle valve V3, the compression-side throttle valve V4, and the adjusting valve V20. However, the cylinder 1 and the tank 2 may be integrated without the connecting member 3 interposed therebetween, and some or all of the extension-side throttle valve V3, the compression-side throttle valve V4, and the adjusting valve V20 may be installed in the cylinder 1 or the tank 2.

Also, in the present embodiment, the adjusting valve V20, which changes the flow passage area of the compression-side first damping passage (first damping passage) P2, is provided in series with the compression-side main valve (main valve) V2.

According to the above configuration, the compression-side high speed damping force after the compression-side main valve V2 is opened to the maximum can be adjusted by the adjusting valve V20. Accordingly, the damping force characteristics at the time of compression can be adjusted to optimal characteristics according to the specifications of the vehicle, the use environment, the occupant's tastes, and the like. However, the adjusting valve V20 may be dispensed with. Also, in the present embodiment, although the adjusting valve V20 is arranged in series with the compression-side main valve V2, the adjusting valve V20 may be arranged in series with the extension-side main valve V1 to change the flow passage area of the extension-side first damping passage P1.

Also, in the present embodiment, the shock absorber D includes the spring holder 7 inserted in the lower side (the other end side) of the valve body 6 in the case 5 in FIG. 5 and supporting one end of the coil spring (elastic member) S to enable the position thereof in the axial direction in the case 5 to be adjusted.

According to the above configuration, the inflection point Y1 or Y3, which is a point of transition from the damping force based on the orifice characteristics (dashed line X1 or X4 in FIG. 6) to the damping force based on the valve characteristics (solid line X2 or X5 in FIG. 6) in the low speed region, can be adjusted. In addition, in the present embodiment, since each of the extension-side throttle valve V3 and the compression-side throttle valve V4 includes the spring holder 7, the damping force characteristics can be adjusted to optimal characteristics according to the specifications of the vehicle, the use environment, the occupant's tastes, and the like. However, the position of the spring holder 7 for either/both the extension-side throttle valve V3 or/and the compression-side throttle valve V4 may be secured.

Also, in the present embodiment, the shock absorber D includes the cylinder 1, the piston 10 slidably inserted in the cylinder 1 to separate the inside of the cylinder 1 into the extension-side chamber L1 and the compression-side chamber L2, the reservoir R, the extension-side first damping passage P1 connecting the extension-side chamber L to the compression-side chamber L2, the compression-side first damping passage P2 connecting the compression-side chamber L2 to the reservoir R, the extension-side main valve V1 opening/closing the extension-side first damping passage P1 to give resistance to the flow of the liquid flowing in the extension-side first damping passage P1, the compression-side main valve V2 opening/closing the compression-side first damping passage P2 to give resistance to the flow of the liquid flowing in the compression-side first damping passage P2, the extension-side second damping passage P3 connecting the extension-side chamber L1 to the reservoir R, the compression-side second damping passage P4 connecting the compression-side chamber L2 to the reservoir R by bypassing the compression-side main valve V2, the extension-side throttle valve V3 throttling the extension-side second damping passage P3, and the compression-side throttle valve V4 throttling the compression-side second damping passage P4. Each of the extension-side throttle valve V3 and the compression-side throttle valve V4 includes the housing 4 including the valve seat 42b provided at one end thereof in the axial direction, the case 5 inserted in the housing 4 to enable the position thereof in the axial direction to be adjusted, the valve body 6 movably inserted at the upper end (one end) thereof in FIG. 5 in the case 5 toward the valve seat 42b and restricted from moving to the side of the valve seat 42b in the case 5, and the coil spring (elastic member) S biasing the valve body 6 to the side of the valve seat 42b.

The above configuration enables setting in which, even in a case in which the damping force in the ultra-low speed region is increased, and in which the damping force is increased rapidly along with an increase of the speed, the valve body 6 retracts before the extension-side main valve V1 or the compression-side main valve V2 is opened. In such setting, the flow passage area of the orifice O is increased by the retraction of the valve body 6, and the slope of the characteristic line (solid line X2 or X5 in FIG. 6) in the latter low speed region can be gentle. Accordingly, when the extension/compression speed of the shock absorber D changes from the low speed region to the high speed region, and the damping force characteristics are switched to the valve characteristics of the extension-side main valve V1 or the compression-side main valve V2, the damping force characteristics are not changed greatly, and the occupant can be free from perceiving a shock and feeling poor ride quality. That is, according to the above configuration, the ride quality in the ultra-low speed region is maintained, and a shock at the time of transition from the low speed region to the high speed region can be reduced.

In addition, according to the above configuration, the damping forces in the ultra-low speed region at the time of extension and at the time of compression can be adjusted individually.

Meanwhile, in the present embodiment, the shock absorber D includes both the extension-side throttle valve V3 and the compression-side throttle valve V4, and each includes the configuration according to the present invention. However, either the extension-side throttle valve V3 or the compression-side throttle valve V4 may be omitted, and either the extension-side throttle valve V3 or the compression-side throttle valve V4 that is left may include the configuration according to the present invention.

The invention claimed is:

1. A shock absorber comprising:
a first damping passage connecting two chambers to each other;
a main valve opening/closing the first damping passage to give resistance to flow of liquid flowing in the first damping passage;
a second damping passage connecting the two chambers to each other by bypassing the main valve; and
a throttle valve throttling the second damping passage, wherein the throttle valve includes:
a housing including a valve seat provided at one end thereof in an axial direction;
a case inserted in the housing to enable a position of the case to be adjusted in the housing in the axial direction with respect to the housing;
a valve body movably inserted at one end thereof in the case toward the valve seat and restricted from moving toward the valve seat by a stopper portion of the case on a side of the valve seat, wherein the valve body is movable inside of the case in the axial direction with respect to the case; and
an elastic member biasing the valve body toward the valve seat, and
wherein a flow passage area of an orifice formed between the valve body and the valve seat is adjusted by adjusting the position of the case in the housing in the axial direction with respect to the housing.

2. The shock absorber according to claim 1, further comprising:
a cylinder;
a piston slidably inserted in the cylinder to separate an inside of the cylinder into an extension-side chamber and a compression-side chamber; and
a reservoir,
wherein the first damping passage connects the extension-side chamber to the compression-side chamber, and
wherein the second damping passage connects the extension-side chamber to the reservoir.

3. The shock absorber according to claim 1, further comprising:
a cylinder;
a piston slidably inserted in the cylinder to separate an inside of the cylinder into an extension-side chamber and a compression-side chamber; and
a reservoir,
wherein the first damping passage includes an extension-side first damping passage connecting the extension-side chamber to the compression-side chamber and a compression-side first damping passage connecting the compression-side chamber to the reservoir,
wherein the main valve includes an extension-side main valve opening/closing the extension-side first damping passage to give resistance to flow of liquid flowing in the extension-side first damping passage and a compression-side main valve opening/closing the compression-side first damping passage to give resistance to flow of liquid flowing in the compression-side first damping passage, wherein the second damping passage includes an extension-side second damping passage connecting the extension-side chamber to the reservoir and a compression-side second damping passage connecting the compression-side chamber to the reservoir by bypassing the compression-side main valve, and wherein the throttle valve includes an extension-side throttle valve throttling the extension-side second damping passage and a compression-side throttle valve throttling the compression-side second damping passage.

4. The shock absorber according to claim 1, further comprising:

a spring holder inserted in another end side of the valve body in the case and supporting one end of the elastic member to enable a position thereof in the case in the axial direction to be adjusted.

5. The shock absorber according to claim 3, wherein an adjusting valve changing a flow passage area of the compression-side first damping passage is provided in series with the compression-side main valve.

6. The shock absorber according to claim 5, further comprising:

a tank provided outside the cylinder and having formed therein the reservoir; and a connecting member connecting the cylinder to the tank, wherein one or more of the extension-side throttle valve, the compression-side throttle valve, or the adjusting valve are attached to the connecting member.

7. The shock absorber according to claim 1, wherein an adjusting valve changing a flow passage area of the first damping passage is provided in series with the main valve.

8. The shock absorber according to claim 1, wherein the housing comprises a tubular housing with an inner circumference, wherein the case comprises a tubular case, and wherein the tubular case is screwed into the inner circumference of the tubular housing.

* * * * *